Patented Nov. 17, 1931

1,832,813

UNITED STATES PATENT OFFICE

CHARLES E. LUKE, OF IRWIN, PENNSYLVANIA, ASSIGNOR TO JERSEY CEREAL COMPANY, OF IRWIN, PENNSYLVANIA, A CORPORATION OF PENNSYLVANIA

CEREAL FOOD AND PROCESS OF MAKING THE SAME

Application filed August 3, 1929, Serial No. 383,375, and in Canada September 28, 1928.

My invention relates to cereal foods and particularly to an expanded or puffed ready to eat cereal food. It also relates to a process of making an expanded or puffed ready to eat cereal food product.

A method heretofore used in making puffed cereal grains consists in treating the grain kernels under steam at high pressure and then suddenly liberating the pressure. The result is that the steam entrapped in the kernels expands, thereby bursting or disrupting the cell walls. A kernel so treated will expand as much as eight times its original volume. The kernel is compressible and has an outer surface that is substantially smooth to the naked eye. A section through the expanded kernel presents a pithy appearance in which small spaces are defined by irregular fibrous walls which are deformable. When deformed, as by compressing, the kernel does not return to its original shape. Such puffed grains are not toasted during the puffing operation and, moreover, are materially affected by atmospheric conditions.

Flaked cereals, such as corn flakes, rice flakes and the like, have heretofore been manufactured by cooking grain elements such as kernels and/or parts thereof in a closed retort under steam pressure, in the presence of flavoring and coloring materials and water. The retorts are generally in the form of revolving cylinders. The cooking process is carried on until the grain elements are uniformly cooked to a soft and pliable condition but without destroying the identity of the grain elements or dissolving the starch cells. The cooking toughens the starch cells in the grain elements, rather than destroys them by dissolution.

After the grain elements are removed from the retorts, they are passed through a cooler for removing the excess moisture in the form of vapor liberated from the grain elements. From the cooler the grain elements are passed to a dryer in which air circulates. The time during which the grain elements are left in the dryer depends somewhat upon the volume of the grain elements, and is carried on until the grain contains from nineteen to twenty-one percent of moisture by weight.

After leaving the dryers, the grain elements are passed through coolers, through which air is circulated until the grain is reduced to a temperature which is warm to the touch but is not high enough to cause discomfort to the hand. After the grain elements are thus cooled, they are placed in storage bins where they are allowed to stand from eighteen to twenty-four hours or until the grain elements are in a uniform, tough and pliable condition, and the moisture is evenly distributed throughout the mass and throughout the individual grain elements. The moisture content of the grain elements is substantially nineteen to twenty-one percent of moisture by weight.

After tempering, the grain elements are passed through rollers. The rollers are so set as to flatten the kernels into flakes. The extent of the flaking is such as to entirely destroy the original appearance and identity of the kernels and reduce them to very thin flakes of substantially the thickness of a sheet of writing paper, or say, from three to five thousandths of an inch. The flakes are then passed through an oven where they are toasted. The flakes upon leaving the oven have substantially the same outline as when leaving the rolls. Portions of the flakes may be raised or blistered during the toasting operation but the individual flakes as a whole are not materially modified in shape or increased in size or substantially changed in shape, nor are they puffed during this heat-treating operation which is carried on at a temperature of approximately 450° F. and at atmospheric pressure.

I have found that by following through substantially the same steps of cooking and toasting cereal grains as are followed in the manufacture of "flakes", but by spacing the rolls so that the grains are slightly flattened as distinguished from being crushed into a "flaked" condition, the grains are puffed as well as toasted during the heat treatment. The amount of flattening of the individual grains may vary slightly and should be sufficient to form a substantial plane surface on each side thereof but insufficient to reduce them to a "flaked" condition, as the term has heretofore been known in the art.

By way of example, and not as a limitation of the invention, rice kernels treated in accordance with the present invention expand from three to four times their original volume during the final heat treatment. A section through the toasted and puffed rice kernels discloses a cellular structure in which non-deformable webs separate irregular but well-defined hollow spaces. The outer surfaces of the puffed kernels may display irregularly shaped blisters. The individual grains or elements, as a whole, are not compressible and withstand a considerable pressure before crushing. When crushed, the puffed and toasted grains or elements disintegrate into a large number of small particles.

In the accompanying drawings, which illustrate the product at various stages of the process, Figure 1 is an enlarged perspective view of a cooked grain kernel;

Figure 1:
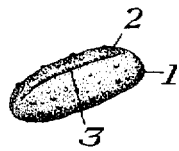

In describing the invention and for the purpose of illustration I shall refer particularly to the processing of rice and especially whole rice kernels although it is to be understood that the starting material may be any suitable cereal grain and also that it may be in the form of whole kernels and/or parts thereof. The raw materials may therefore be appropriately referred to as grains, kernels of grain, units or grain elements. Where whole grain kernels are employed the bran may be removed before the cooking operation. In the case of broken grain the bran may or may not be adhering to the parts.

Assuming whole rice as the raw material, the rice is prepared by cooking it in water and, preferably, with seasoning and coloring material, such as salt, malt, syrup, sugar and the like. The cooking may be carried on in a closed retort, as, for example, a revolving cylinder, under steam pressure of from, say, fifteen to twenty-five pounds per square inch or until the individual rice kernels are uniformly cooked throughout and are in a soft and pliable condition, as in the ordinary cooking operation employed in the manufacture of "flaked" cereals as the term has heretofore been used in the art.

The cooking operation does not materially alter the identity of the grain kernels or result in materially breaking or rupturing the outer surfaces thereof, the kernels remaining intact although somewhat swollen. The rice kernels, indicated by 1 in the drawings, at this time, that is after the cooking operation, exhibit a slightly irregular surface 2 and the seam 3 of the natural grain.

By the addition of malt to the grains during the cooking operation, the flavor of the finished product is improved and the fibrous content of the product is increased over the fibrous content of the natural grain. The malt used is preferably pulverized barley malt. The other flavoring and coloring ingredients are salt and sugar. The proportions of these different ingredients may be varied as desired. In general, I have used a flavoring mixture of 1½% salt, 1½% of malt, and 2 to 3% sugar, by weight. These ingredients may be put into the water in which the grain is cooked and thus caused to permeate the individual grains.

After the cooking operation the grain elements are passed through a cooler and dryer, which may be unitary or may comprise separate cooling and drying units, for removing the excess moisture. A revolving cylinder, by means of which the grain is agitated so as to separate the kernels which have stuck together and in which air is circulated by means of an exhaust fan, may be employed for the drying operation. The drying and cooling are carried on until the surface moisture is removed. The kernels, particularly at the surfaces thereof, are tough or rubbery and pliable and in a condition such that they will not "sweat" after being removed from the dryer and cooler and placed in bins. Due to the cooling action the grain is only slightly warm when removed from the dryer, and the moisture content has been reduced to, say, from 23 to 26 per cent, by weight, at this point, which is slightly higher than with cereals intended to be "flaked".

While ordinarily a dryer such as the revolving cylinder above mentioned would be employed for drying the grains to remove the surface moisture after the cooking operation, the same end may be attained in other ways, as by placing the cooked grain in a heated room or by merely subjecting the grain to exposure in the atmosphere. Such drying to remove the surface moisture may also be brought about due to mechanical handling of the grains or to the mere length of time that elapses between the cooking of the grains and the rolling operation. A drying machine, however, is preferred, as it enables the process to be more expeditiously carried out.

The cooked rice need not necessarily be subjected to a tempering operation, such as is ordinarily used in making "flaked" cereals before the grain is passed through the rolls. In ordinary manufacturing operations some time elapses between the cooling or drying operation and the rolling operation, due to conveying the cooked grain from the dryer to the rolls and due to keeping a stock of cooked grain on hand. In practice, I have obtained satisfactory results when the grain was exposed to the atmosphere for an hour before being passed through the rollers. In other cases, I have obtained satisfactory results where six hours have elapsed between the cooling and drying operation and the rolling operation.

Figure 2:
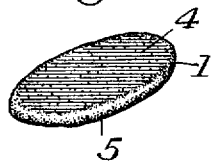
Figure 2 is a perspective view of the grain kernel after it has been passed through compression rolls.

The rice, after the cooling and drying step, and whether or not subjected to a tempering operation, is then passed through suitable rolls such as those used in making "flaked" cereals, but the rolls are so set that the individual kernels are only slightly flattened or compressed, as shown in Fig. 2, and are not reduced to a "flaked" condition. The kernels being tough and pliable, the outer surface or skin of the rice grain is not materially broken or ruptured by the compressing operation, and the substantial identity of the kernels is not destroyed. The amount of flattening is sufficient to form substantially plane surfaces, as indicated by 4 on Fig. 2, on each kernel and an edge portion 5 that is not flattened. The amount of compression of the kernels is materially less than that given to grains in making "flaked" cereals as heretofore known.

As an example of the flattening, and not by way of limitation of the invention, illustrative dimensions of a rice kernel are set forth. Raw rice kernels may have an initial thickness of from 65 to 75 thousandths of an inch, the thickness varying with the grade of rice. In my process, rice kernels are rolled to a thickness of, say, from 20 to 55 thousandths of an inch before being puffed or expanded. The thickness of kernels destined for "flaking" cereals is from about 3 to 5 thousandths of an inch, after the rolling operation. According to the present process, rice kernels after being rolled have a thickness of from substantially six to ten times the thickness of the rice kernels destined for "flaked" products.

The rice, flattened by the rolls as described, then passes to a suitable oven, such as that employed in toasting "flaked" cereals, where it is subjected to dry heat at atmospheric pressure. The temperature of the oven may vary in accordance with the amount of material passing through it. Temperatures as low as 250° F. may be used, and temperatures as high as 500° F. and possibly higher, may be used, if the rate of movement and the volume of material traversing the oven is correspondingly increased. In general, I prefer to use a temperature of from 400 to 450° F. in the oven. The oven is maintained at a single average temperature, although variations in the temperatures of different parts of the oven are experienced by reason of the natural circulation of gases.

Figure 3:
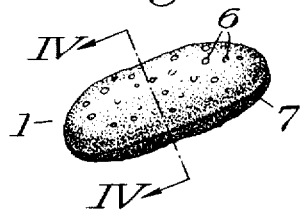
Figure 3 is an enlarged perspective view of the grain kernel after the toasting and puffing operation.
Figure 4:
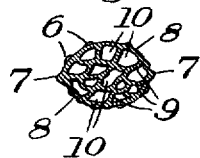
Figure 4 is a cross-sectional view thereof taken along the section lines IV—IV of Figure 3.

During the oven treatment the flattened individual rice kernels expand or puff up bodily, that is to say, substantially in all directions, as indicated in Fig. 3, from, say, three to four times the size of the original kernels, and, being also toasted, take on a toasted color. The expansion or puffing of the grain distinguishes my process from the prior "flaking" process where the grain in the final product remains in a substantially flat or "flaked" condition. The outer surfaces of the expanded rice kernels also show small irregularly placed blisters 6.

The uncompressed edge portion 5 of the kernel may appear as a ridge 7 extending around the periphery of the puffed cereal. Where whole kernels are used, the ridge 7, if present, is substantially elliptical in outline, and the seam 3 of the original kernels is not discernible in the puffed cereal. The outer surfaces 8 of the puffed grains consist of a shell of brittle non-deformable fibrous material tapering toward the ridge 7, if present. The interior of the puffed cereal is defined by a series of intersecting ribs or webs 9 and the webs 9 define irregular substantially hollow spaces 10 of considerable extent.

The webs 9 are also non-compressible and, accordingly, the puffed cereal is capable of withstanding considerable pressure before it collapses. When collapsing, the individual units or elements, as a whole, that is the webs 9 and outer walls 8, break up into a large number of fragments such as are characteristic of the crushing of a brittle or friable material.

While I am not certain of the exact reaction taking place within the grain elements during the flattening operation, it is possible that one of two actions or a combination of them takes place. One theory is that the flattening operation disrupts the inter-cellular structure of the elements sufficiently to form small crevices or pockets, thereby weakening the structure so that when an element is subsequently treated in the oven, steam accumulates in the crevices or pockets and expands it.

Another theory of the behavior of the grain elements is that the compressing operation renders the surfaces of the elements and, possibly, those of the individual cells, more impervious to the escape of moisture than in the uncompressed grain, so that the moisture thus confined expands during the subsequent treatment in the oven and thus puffs the individual elements. The individual cells, however, are not ruptured, as in the case where the kernel is "flaked", as the term has heretofore been used in the art.

While I am not certain as to the exact nature of the reaction within the grain during the puffing operation, I believe that the moisture, whether confined in crevices in the individual cells or by the surface of the grain elements, as previously explained, expands under the action of the high heat of the oven against atmospheric pressure, thereby forming the spaces 10. As the uncompressed portion 5 of the grain element sometimes appears as a ridge 7, this fact leads me to believe that the pressing operation mechanically weakens the inter-cellular structure of the grain element sufficiently to permit its expansion.

By reason of the process employed the puffed product is substantially unaffected by the atmosphere and thus retains its crispness and friability over a long period of time.

While I have described my method and also my new product particularly in connection with rice kernels, it is to be understood that other food cereals such as corn may be treated according to the same process and that the use of such cereals is contemplated within the spirit of the invention and the scope of the appended claims. It is further to be understood that grain in other forms than whole kernels, such as parts of grain kernels or a mixture of whole kernels and broken kernels or parts thereof, may be treated according to the process.

While I have described the preferred form of my invention both as to process and as to product, it will be evident that variations in the process and in the nature of the product may be made without departing from my invention as set forth in the following claims:

I claim as my invention:

1. In a cereal food, a toasted and puffed rice kernel, the interior of which is formed by intersecting brittle webs defining substantially hollow spaces.

2. In a ready to eat cereal food, a toasted and puffed rice kernel having a size at least twice that of the original grain, the interior of which is formed by intersecting brittle webs defining substantially hollow spaces.

3. A prepared cereal food, comprising cooked grain elements of the class comprising corn and rice puffed to greatly enlarged volume and which are brittle and non-deformable and which when crushed disintegrate into a large number of small particles.

4. A puffed, cooked rice element expanded substantially in all directions to at least twice the size of the original element and having a cellular structure, and which as a whole is brittle and when crushed breaks into a large number of fragments.

5. In a method of preparing a cereal food, the steps comprising subjecting a cooked rice kernel while in a pliable condition to a flattening operation sufficient to alter the internal structure of the kernel but without reducing the kernel to a flake as the term "flake" is understood in the art, and subjecting the flattened kernel to heat for puffing and toasting it.

6. In a method of preparing a cereal food, the steps comprising cooking a rice kernel until pliable, removing excess moisture while still leaving the kernel as a whole in a pliable condition, subjecting the cooked kernel to a sufficient pressure to flatten the opposite surfaces of the kernel without reducing the kernel to a flake, and subjecting the kernel to heat for puffing and toasting it.

7. In a method of preparing a cereal food, the steps comprising cooking a grain element of the class consisting of corn and rice in moisture until pliable, subjecting the cooked element to sufficient pressure to flatten the opposite surfaces of the element without reducing it to a flake and without substantially disrupting or cracking the surface thereof, and subjecting it to heat for puffing and toasting it.

8. A method of preparing a cereal food, comprising cooking in moisture grain kernels of the class consisting of rice and corn in the manner ordinarily employed in making flaked cereals, removing excess moisture while leaving the kernels pliable as a whole, slightly flattening the individual kernels to form a substantially plane surface on each side thereof but insufficiently to reduce the kernels to a flaked condition, and subjecting the kernels to dry heat at a temperature sufficient to puff the kernels and render each kernel as a whole brittle.

9. A method of preparing a cereal food comprising cooking grain kernels of the class consisting of rice and corn in the presence of moisture and under steam pressure until the same are pliable, at least partially drying the surfaces of the kernels, slightly flattening the individual kernels but insufficiently to reduce the kernels to a flaked condition as the term "flake" is understood in the art, and subjecting the kernels to dry heat at a temperature sufficient to puff them to a size at least twice as large as the original kernels, and also toast them.

10. In a method of preparing a cereal food, the steps comprising cooking a rice element in moisture and with flavoring materials until it is substantially cooked and pliable throughout, partially drying and toughening the element while still leaving it in a pliable condition, subjecting the cooked element to pressure to slightly flatten it without reducing it to a flake, and subjecting the element to dry heat at a temperature sufficient for puffing it to at least twice its original size and also toasting it.

11. A method of preparing a puffed or expanded cereal food product comprising cooking in moisture until pliable throughout a cereal grain of the class consisting of corn and rice, in the form of units, such as whole kernels and/or parts thereof, partially drying the units while still leaving them pliable, subjecting the pliable individual units to sufficient pressure to flatten the same without reducing them to flakes as the term "flakes" is understood in the art, and subjecting the units to heat to puff the same.

12. A method of preparing a ready-to-eat cereal food comprising cooking rice in moisture, subjecting the cooked rice kernels while in a pliable condition to sufficient pressure to flatten them but insufficient to reduce them to flakes, as the term "flakes" is understood in the art, and without substantially disrupting or cracking the surfaces thereof, and subjecting the flattened kernels to dry heat at a temperature of about between 400 and 500 degrees Fahrenheit to puff the kernels.

In testimony whereof I have hereunto set my hand.

CHARLES E. LUKE.

and subjecting the units to heat to puff the same.

12. A method of preparing a ready-to-eat cereal food comprising cooking rice in moisture, subjecting the cooked rice kernels while in a pliable condition to sufficient pressure to flatten them but insufficient to reduce them to flakes, as the term "flakes" is understood in the art, and without substantially disrupting or cracking the surfaces thereof, and subjecting the flattened kernels to dry heat at a temperature of about between 400 and 500 degrees Fahrenheit to puff the kernels.

In testimony whereof I have hereunto set my hand.

CHARLES E. LUKE.

CERTIFICATE OF CORRECTION.

Patent No. 1,832,813.            November 17, 1931.

CHARLES E. LUKE.

It is hereby certified that error appears in the printed specification of the above numbered patent requiring correction as follows: Page 1, at the beginning of the printed specification insert:-

This application is a continuation in part of my application Ser. No. 230,263, filed November 1, 1927.

and that the said Letters Patent should be read with this correction therein that the same may conform to the record of the case in the Patent Office.

Signed and sealed this 12th day of July, A. D. 1932.

(Seal)

M. J. Moore,
Acting Commissioner of Patents.

CERTIFICATE OF CORRECTION.

Patent No. 1,832,813.　　　　　　　　　　　　　　　　　　　November 17, 1931.

CHARLES E. LUKE.

It is hereby certified that error appears in the printed specification of the above numbered patent requiring correction as follows: Page 1, at the beginning of the printed specification insert:-

This application is a continuation in part of my application Ser. No. 230,263, filed November 1, 1927.

and that the said Letters Patent should be read with this correction therein that the same may conform to the record of the case in the Patent Office.

Signed and sealed this 12th day of July, A. D. 1932.

(Seal)　　　　　　　　　　　　　　　　　　　　　　　　M. J. Moore,
　　　　　　　　　　　　　　　　　　　　　　　Acting Commissioner of Patents.